(12) United States Patent
Haslach

(10) Patent No.: US 9,908,611 B2
(45) Date of Patent: Mar. 6, 2018

(54) CHANGEABLE WING PROFILE

(71) Applicant: Airbus Defence and Space GmbH, Ottobrunn (DE)

(72) Inventor: Horst Haslach, Geretsried (DE)

(73) Assignee: AIRBUS DEFENCE AND SPACE GMBH, Ottobrunn (DE)

( * ) Notice: Subject to any disclaimer, the term of this patent is extended or adjusted under 35 U.S.C. 154(b) by 87 days.

(21) Appl. No.: 14/905,102

(22) PCT Filed: Jul. 10, 2014

(86) PCT No.: PCT/DE2014/000347
§ 371 (c)(1),
(2) Date: Jan. 14, 2016

(87) PCT Pub. No.: WO2015/007258
PCT Pub. Date: Jan. 22, 2015

(65) Prior Publication Data
US 2016/0159455 A1 Jun. 9, 2016

(30) Foreign Application Priority Data
Jul. 17, 2013 (DE) .......................... 10 2013 011 915

(51) Int. Cl.
*B64C 3/44* (2006.01)
*B64C 3/48* (2006.01)
(Continued)

(52) U.S. Cl.
CPC ................ *B64C 3/44* (2013.01); *B64C 3/185* (2013.01); *B64C 3/48* (2013.01); *B64C 9/00* (2013.01);
(Continued)

(58) Field of Classification Search
CPC .... B64C 3/44; B64C 3/48; B64C 3/52; B64C 3/14; B64C 3/38; B64C 3/185;
(Continued)

(56) References Cited

U.S. PATENT DOCUMENTS

| | | | |
|---|---|---|---|
| 1,341,758 A * | 6/1920 | Humphrey | B64C 3/48 244/219 |
| 3,118,639 A | 1/1964 | Kiceniuk | |

(Continued)

FOREIGN PATENT DOCUMENTS

| | | |
|---|---|---|
| DE | 263 546 A | 2/1912 |
| DE | 2348304 A1 | 3/1975 |

(Continued)

OTHER PUBLICATIONS

German Patent Office, German Search Report for German Patent Application No. 10 2013 011 915.4 dated Mar. 18, 2014.

(Continued)

*Primary Examiner* — Benjamin P Lee
(74) *Attorney, Agent, or Firm* — Lorenz & Kopf, LLP

(57) ABSTRACT

This relates to changes in wing profiles. In order to provide an aerodynamic structure that can be variably adjusted and changed with respect to the wing profile, it is provided that an aerodynamic structure for a wing or rudder arrangement of an aircraft comprises a support structure and an outer skin. The support structure comprises an adaptive surface support structure in a longitudinal direction, which extends in a longitudinal direction from a root area to an outer end area, and is formed by a support surface, which comprises an adjustable periodic profiling that runs in the transverse direction, in which first flange areas and second flange areas are alternatingly formed, and joined together by web areas (Continued)

running in the direction of a profile height. Alternatingly aligned open profile segments running in the longitudinal direction are here formed.

12 Claims, 5 Drawing Sheets

(51) Int. Cl.
  *B64C 3/18* (2006.01)
  *B64C 9/00* (2006.01)
(52) U.S. Cl.
  CPC ....... *B64C 2003/445* (2013.01); *Y02T 50/145* (2013.01)
(58) Field of Classification Search
  CPC ........ B64C 2003/445; B64C 2003/142; B64C 9/00; Y02T 50/145
  See application file for complete search history.

(56) References Cited

U.S. PATENT DOCUMENTS

| | | | |
|---|---|---|---|
| 4,247,066 A | 1/1981 | Frost et al. | |
| 4,341,176 A * | 7/1982 | Orrison | B63H 9/0607 114/102.22 |
| 5,531,407 A * | 7/1996 | Austin | B64C 3/48 244/219 |
| 6,010,098 A * | 1/2000 | Campanile | B64C 3/48 244/219 |
| 6,129,308 A * | 10/2000 | Nastasi | B64C 3/48 244/120 |
| 6,138,956 A * | 10/2000 | Monner | B64C 3/48 244/215 |
| 7,699,270 B2 * | 4/2010 | Lonsinger | B64C 3/185 244/219 |
| 8,056,865 B2 * | 11/2011 | Grip | B64C 3/48 244/201 |
| 8,382,045 B2 * | 2/2013 | Manley | B64C 9/16 244/213 |
| 2002/0100842 A1 * | 8/2002 | Perez | B64C 3/48 244/219 |
| 2006/0145029 A1 * | 7/2006 | Lonsinger | B64C 3/185 244/219 |
| 2006/0145031 A1 | 7/2006 | Ishikawa et al. | |
| 2006/0237596 A1 * | 10/2006 | Perez-Sanchez | B64C 3/48 244/219 |
| 2009/0200431 A1 * | 8/2009 | Konings | B64C 3/385 244/213 |
| 2011/0017876 A1 * | 1/2011 | Manley | B64C 3/48 244/219 |
| 2011/0084174 A1 * | 4/2011 | Hemmelgarn | B64C 3/48 244/200 |
| 2012/0104181 A1 * | 5/2012 | Rix | B64C 3/48 244/219 |
| 2015/0023797 A1 * | 1/2015 | Egbert | B64C 3/14 416/223 R |
| 2015/0267397 A1 * | 9/2015 | Benthien | B64C 3/38 52/645 |
| 2016/0159456 A1 * | 6/2016 | Haslach | B64C 3/48 244/219 |
| 2016/0185443 A1 * | 6/2016 | Rawdon | B64C 3/48 244/219 |

FOREIGN PATENT DOCUMENTS

| | | | |
|---|---|---|---|
| DE | 10317258 B4 | 11/2004 | |
| DE | 102004045651 A1 * | 3/2006 | ............... B64C 3/48 |
| DE | 2179918 A2 | 4/2010 | |
| DE | 102013011917 A1 * | 1/2015 | ............... B64C 3/48 |
| GB | 472567 A * | 9/1937 | ............... B64C 3/48 |
| GB | 1468281 A * | 3/1977 | ............... B64C 3/48 |
| GB | 0712552 * | 8/2007 | ............ B29C 70/30 |
| WO | 03018853 A2 | 3/2003 | |

OTHER PUBLICATIONS

International Searching Authority, International Search Report for International Patent Application No. PCT/DE2014/000347 dated Jul. 17, 2013.

* cited by examiner

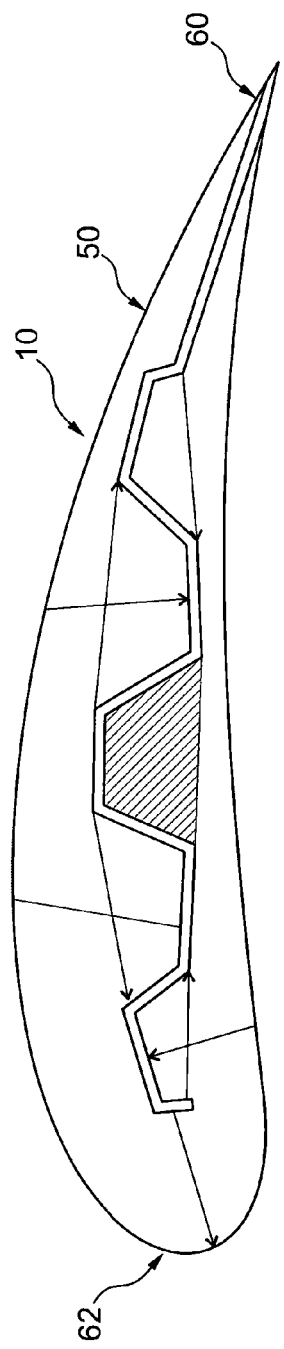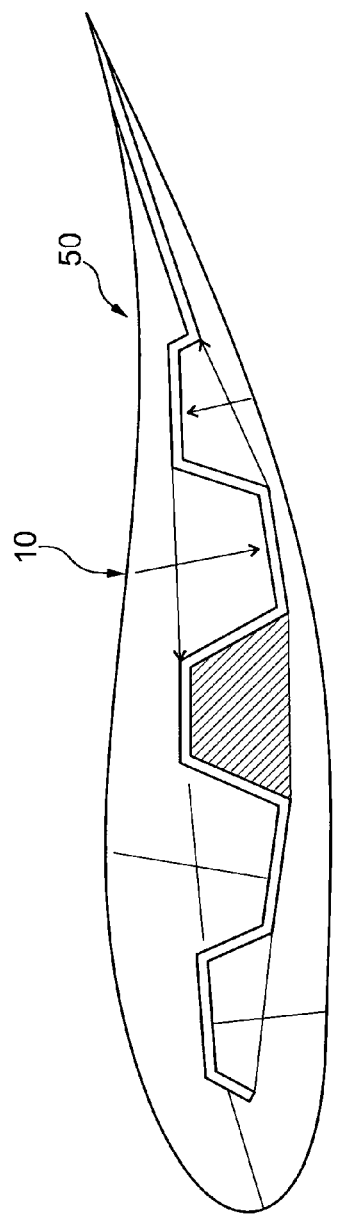
Fig. 1B
Fig. 1C

CHANGEABLE WING PROFILE

CROSS-REFERENCE TO RELATED APPLICATION

This application claims priority to International Patent Application No. PCT/DE2014/000347, filed Jul. 10, 2014, which claims priority to German Patent Application No.: 10 2013 011 915.4 filed Jul. 17, 2013, which is incorporated herein by reference in its entirety.

TECHNICAL FIELD

The present embodiment relates to changes in wing profiles, and in particular relates to an aerodynamic structure for a wing or rudder arrangement of an aircraft, an aircraft, a method for adjusting an outer contour of an aerodynamic structure for a wing or rudder arrangement, and the use of an aerodynamic structure in an aircraft.

BACKGROUND

For example, rudders or rudder segments are provided in wing and control surfaces for control purposes. Additional flaps are also used for adjusting the profile to aerodynamic conditions, for example in the starting phase, during cruise flight, or even in the landing phase. Both the use of rudder elements and the use of additional flaps serves to change the aerodynamically active profile, i.e., so as to be able to adjust the respective wing and control surfaces to various situations. For example, DE 103 17 258 B4 describes an adjustment mechanism for a variable-shape wing. However, it has been shown that there exists an added demand for further changes in the contour of the wing profile.

Therefore, the object of the present embodiment is to provide an aerodynamic structure that can be adjusted and changed in a variety of ways with regard to the wing profile.

This object is achieved by an aerodynamic structure for a wing or rudder arrangement of an aircraft, an aircraft, a method for adjusting the outer contour of an aerodynamic structure for a wing or rudder arrangement, and the use of an aerodynamic structure in an aircraft according to one of the independent claims. Exemplary embodiments are described in the claims.

According to an embodiment, an aerodynamic structure for a wing or rudder arrangement of an aircraft is provided. The aerodynamic structure comprises a support structure and an outer skin. The support structure comprises an adaptive surface support structure in the longitudinal direction, which extends in the longitudinal direction from a root area to an outer end area, and is formed by a support surface, which exhibits an adjustable periodic profiling that runs in a transverse direction, in which first and second flange areas are alternatingly formed, and joined together by web areas running in the direction of a profile height. Alternatingly aligned open profile segments running in the longitudinal direction are here formed. In the area of the open profile segments, the support structure comprises several connecting segments running in the transverse direction, which join together two adjacent first or second flange areas. At least a portion of the connecting segments are designed as adjustable-length connecting segments, so that the distance between the adjacent first or second flange areas can be adjusted. The outer skin is attached to the support surface. An outer contour of the aerodynamic structure can be changed at least in the transverse direction by adjusting the distance between the adjacent first or second flange areas.

Provided in this way on the one hand is a supporting structure, for example for a wing or rudder arrangement, but which on the other hand can already be changed in terms of this contour relative to the transverse direction of the wing. In other words, the support structure itself is already designed to be changeable, so as to provide an outer contour of the aerodynamic structure that is as variably adjustable as possible.

Because the outer contour is adjustable, the aerodynamic drag can be reduced, for example in the case of rudders or also wings. The aerodynamic performance of the wing or rudder can be improved at the same time, for example because slits for modifying the aerodynamically effective contour in the case of additional flaps, etc., are not required given the changing shape of the support structure. Another advantage to the absent slit is a reduction in noise and decrease in the electromagnetic signature (radar signature) of an aircraft.

The terms "transverse direction" and "longitudinal direction" relate to a wing or rudder arrangement running transverse to the flight direction. For example, the longitudinal direction of an oblong wing as viewed in the attachment direction runs transverse to the flight direction. The transverse direction then runs in the flight direction, for example.

Given wing or rudder arrangements inclined relative to the flight direction, the transverse direction runs inclined in relation to the longitudinal axis of the wing, for example.

Given a wing or rudder arrangement attached at one end to a support structure, e.g., a fuselage structure, the longitudinal direction can also be referred to as the attachment direction, overhang direction or primary direction. The transverse direction then runs transverse to the attachment direction, and can also be referred to as the secondary direction.

In the case of a wing, the root area is the wing root, and the outer end area is the outer wing end.

The term "periodic profiling" refers to a repeating sequence of flanges and webs, as well as to the alternatingly aligned, open profile segments. The profiling can here vary in its specific dimensions, e.g., increase or decrease with the degree of profiling. For example, the profiling can exhibit an increasing or decreasing periodicity or an increasing or decreasing amplitude.

The periodic profiling can also be referred to as a wave-like profile, wherein waves are also understood as trapezoidal structures, or trapezoidal waves.

The web areas run in the direction of the profile height, and the flange areas run on the two outer sides of the profiling, e.g., in the upper and lower areas of the profiling for a wing.

In an example, the adjustable-length connecting segments are provided as actuating drives, actuating elements, guide elements or actuators.

The support structure is formed by the surface supporting structure and the connecting segments. As a consequence, the support structure forms a stable inner structure of the aerodynamic structure, for example of a wing or a rudder.

"Aerodynamic structure" refers to the constituent of a wing or rudder arrangement that produces the aerodynamic effect during aircraft operation, e.g., generates an upward or downward force on a wing, or generates a torque on a rudder to change the direction. The aerodynamic structure can also be referred to as a wing or rudder structure. The term "aerodynamic structure" is used in conjunction with the present embodiment to denote the constituents shared in common by a wing and rudder arrangement. For example, wing and rudder arrangements exhibit an outer surface exposed to the air flow, which is also referred to as the outer skin. This surface produces the desired aerodynamic effect, e.g., due to its contour or shape, i.e., because of its cross section exposed to the air flow. Wing and rudder arrangements also exhibit a support structure, so as to hold the surface exposed to the air flow, and introduce the generated forces into the structure of the aircraft.

A portion of the connecting segments are designed as fixed connecting elements, for example.

For example, the aircraft is an airplane; e.g., the aerodynamic structure is a wing surface of a supporting framework of a control surface of a tail unit. The "wing surface" is also referred to as a wing arrangement. In another example, the wing surface is an (essential) constituent of the wing arrangement. The "control surface" is also referred to as a rudder arrangement. In another example, the control surface is an (essential) constituent of the rudder arrangement. The adaptive framework segments provide a variably shaped aerodynamic structure.

The surface support structure comprises a longitudinal beam. The periodic profiling together with the connecting segments forms a transverse rib, or several transverse ribs sequentially provided in the longitudinal direction.

An example provides that the periodic profiling be designed as a trapezoidal profiling and/or a wavelike profiling. This provides an easily to manufacture surface support structure, which is adjustable on the one hand, and exhibits enough stability for introducing the forces on the other. The profiling can also comprise trapezoidal and wavelike segments. In a wavelike profiling, the valley and peak segments of the wave structure form the flange areas, and the areas of the wave structure lying in between form the web areas. The profile can also exhibit a polygonal periodic profiling.

In an example, the web areas and flange areas are interconnected in a longitudinal direction. The profiling can be adjusted in the transverse direction in such a way that a width of the open profile segments can be varied by means of the adjustable connecting segments.

An example provides that a segment open to the top or bottom be divided with an intermediate web, and that fixed connections or adjustable guide elements be provided between the lateral walls, i.e., the webs and the intermediate web.

An example provides that the connecting areas between the web areas and flange areas exhibit a flexibility, so as to change an angle between the web areas and flange areas. The variability of the angle is tailored to the possible change in length of the adjustable connecting segment, for example. An example provides that the web areas be deformable to a certain extent.

In an example, at least one open profile segment is designed as a spar, which extends in the longitudinal direction from a root area to an outer end area. Providing a spar offers additional stability, so that the surface support structure is exposed to other loads in the other areas, as a result of which these areas make do with less material, thereby additionally economizing on weight. In an example, the spar is integrated into the surface support structure.

In an example, the surface support structure is connected to the spar in a central area of the surface support structure in such a way that adaptive areas of the surface support structure transverse to the longitudinal direction of the spar are formed on both sides of the spar, e.g., that a front and rear adaptive area are formed.

In an example, the outer skin can be shaped, and is attached to the surface support structure at least partially via hold points by means of retaining elements. At least a portion of the retaining elements is designed as adaptive mounts, with which the location of the hold points in relation to the surface support structure can be varied.

The retaining elements are also referred to as secondary connecting segments or secondary connecting elements, and the adaptive mounts as secondary, adjustable-length connecting elements. The connecting elements of the surface support structure can be referred to as primary connecting elements, i.e., primary fixed-length connecting elements, and primary adjustable-length connecting elements. For example, the front edge and lateral surfaces of the outer skin are attached to the flange areas by means of retaining elements. On the rear edge, the outer skin can be attached directly to the end areas of the surface support structure.

For example, the hold points are designed as a secondary wing assembly, e.g., as a girder grid with support brackets running longitudinally to the profiling of the surface support structure. The surface support structure together with the connecting segments comprise the primary wing assembly. An example provides that the adaptive mounts be adjustable-length hold members, with which the distance between the hold points and surface support structure can be adjusted. In another example, the adaptive mounts are alternatively or additionally designed as pivoting arms, whose pivoting degree relative to the surface support structure can be adjusted. In an example, the outer skin is a single piece. For example, the outer skin is flexible transverse to the surface. In another example, the outer skin is designed so that it can expand in the direction of the surface. For example, an expandable material or expandable structure is provided for the outer skin, e.g., honeycombs and hybrid composites filled with elastic plastics.

An example provides that changing the profile be controlled in such a way as to prevent any change in length from arising in the surface of the outer skin.

According to the embodiment an aircraft is also provided, which exhibits a fuselage structure, a wing assembly with at least one wing surface, and a tail unit with at least one control surface. The wing assembly and tail unit are held on the fuselage structure. At least one wing surface and/or one control surface is designed with an aerodynamic structure according to one of the preceding examples.

For example, the wing assembly encompasses one or more wings. For example, the tail unit encompasses an elevator, a fin and/or an aileron.

Also provided are combinations thereof, e.g., tailerons or V-tail units. Tailerons are elevators provided on the tail of an airplane, and in which the actual functions of an aileron are enhanced or even entirely replaced by independently actuating the two rudder halves.

According to the embodiment also a method for adjusting an outer contour of an aerodynamic structure for a wing or rudder arrangement is provided. The method comprises the following steps: A) Providing an aerodynamic structure for a wing or rudder arrangement of an aircraft. The aerodynamic structure exhibits a support structure and an outer skin, wherein the support structure exhibits an adaptive surface support structure in the longitudinal direction, which extends in a longitudinal direction from a root area to an outer end area, and is formed by a supporting surface, which exhibits an adjustable periodic profiling that runs in a transverse direction, in which first and second flange areas are alternatingly formed, and joined together by web areas running in the direction of a profile height, wherein alternatingly aligned open profile segments running in the longitudinal direction are here formed. In the area of the open profile segments, the support structure exhibits several connecting segments running in the transverse direction, which join together two adjacent first or second flange areas. At least a portion of the connecting segments are designed as adjustable-length connecting segments. The outer skin is attached to the supporting surface. B) Adjusting the adjustable-length connecting segments. C) Changing the outer contour of the aerodynamic structure at least in the transverse direction.

The embodiment also provides for the use of an aerodynamic structure according to one of the preceding examples in an aircraft.

An aspect of the embodiment provides that an aerodynamic structure, for example a wing, be designed with an adjustable support structure. In a bearing element profiled in the transverse direction that serves as the inner support structure, the support structure is adjusted by inserting actuators into the profiling with which the profiling can be changed. To this end, the profiling is given a periodic design, so that the distance between lateral web segments can be changed in the open profile segments. Since the outer skin is attached to the profiling, changing the inner support structure also causes a change to the outer contour. In addition, the aerodynamic structure can be altered by changing the length of the actuators between the support structure and outer skin.

It is noted that the features in the exemplary embodiments and aspects of the devices also apply to embodiments of the method and use of the device and vice versa. In addition, those features can be freely combined with each other even if doing so is not explicitly mentioned, wherein synergistic effects can arise that go beyond the sum total of different features.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1A:
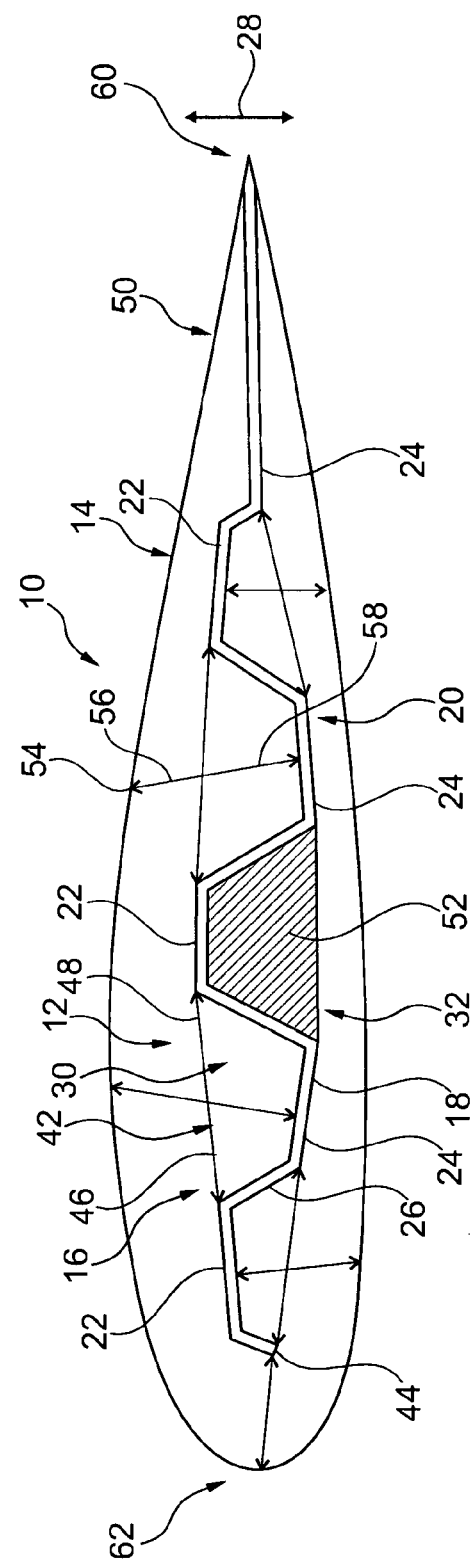
FIG. 1 is a schematic cross section through an example of an aerodynamic structure in a first contour shape on FIG. 1A, in a second contour shape on FIG. 1B, and in a third contour shape on FIG. 1C.

FIG. 1 shows an aerodynamic contour 10 for a wing or rudder arrangement of an aircraft. The aerodynamic structure 10 exhibits a support structure 12 and an outer skin 14. As already mentioned, the aerodynamic structure is shown in cross section in FIG. 1A, and extends in a longitudinal direction, wherein the longitudinal direction is arranged perpendicular to the blade. The support structure 12 exhibits an adaptive surface support structure 16 in the longitudinal direction, which extends in a longitudinal direction from a root area to an outer end area, and is formed by a support surface 18. The support surface 18 exhibits an adjustable periodic profiling 20 that runs in the transverse direction, in which first flange areas 22 and second flange areas 24 are alternatingly formed. The first and second flange areas 22, 24 are joined together by web areas 26 running in the direction of a profile height 28. Alternatingly aligned open profile segments 30 running in the longitudinal direction are here formed. In relation to the illustration in FIG. 1, the first flange areas 22 are arranged at the top, and the second flange areas 23 at the bottom, for example. The web areas 26 run between the top and bottom areas in the direction of the profile height 28, or slightly inclined relative thereto. The periodic profiling 20 is exemplarily designed as a trapezoidal profiling 32 in FIG. 1A. For example, the right edge of the aerodynamic structure 10 exhibits a rear wing edge 60, while the left edge exhibits a front wing edge 62.

Figure 2:
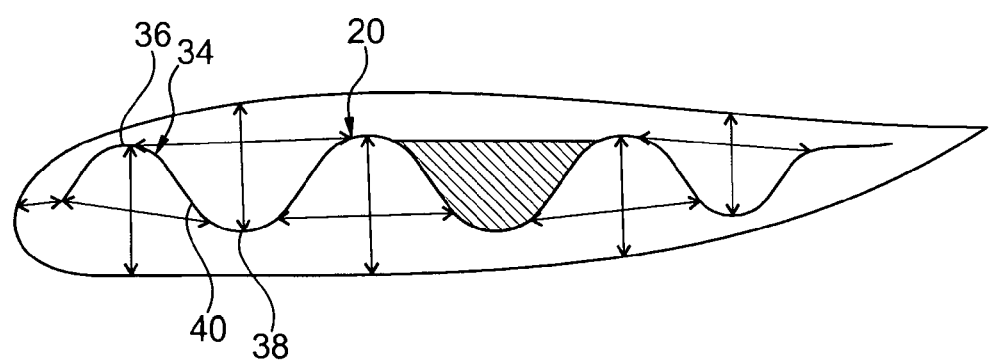
FIG. 2 is another example of an aerodynamic structure in cross section.

In FIG. 2, the periodic profiling 20 is designed as a wavelike profiling 34. In the wavelike profiling 34, peak segments 36 from the first flange areas, and valley segments 38 from the second flange areas. Areas 40 located in between from the web areas.

In another example (not shown), the profiling 20 is designed as a polygonal periodic profiling.

With respect to FIG. 1A, it is noted that the additional features described in conjunction with FIG. 1A also apply to the examples in FIGS. 1B and 1C, and in particular to the example from FIG. 2.

In the area of the open profile segments 30, the support structure 12 comprises several connecting segments 42 running in the transverse direction, which join together two adjacent first or second flange areas. For example, two adjacent first flange areas 22 are connected. In another example, two adjacent second flange areas 24 are joined together, or the lower edges 44 of the profiling at the front end.

At least a portion of the connecting segments 42 are designed as adjustable-length connecting segments 46, so that the distance between the adjacent first or second flange areas can be adjusted. The change in length is denoted by double arrows 48. The outer skin 14 is attached to the support surface 18. An outer contour 50 of the aerodynamic structure 10 can be changed at least in the transverse direction by adjusting the distance between the adjacent first or second flange areas.

In the example shown in FIG. 1A, the web areas 26 and flange areas 22, 24 are interconnected in a longitudinal direction, wherein the profiling can be adjusted in the transverse direction in such a way that a width of the open profile segments 30 can be varied by means of the adjustable connecting segments 46.

In another example shown in FIG. 1A as an additional option, at least one open profile segment is designed as a spar 52, which extends in the longitudinal direction from a root area to an outer end area. For example, the outer skin can be shaped, and is attached to the surface support structure 16 at least partially via hold points 54 by means of retaining elements 56. For example, the outer skin 14 is connected with the opposing flange areas 22, 24 via open profile segments.

In another example, the outer skin 14 is attached to the flange areas facing the respective outer skin (not shown in any greater detail).

At least a portion of the retaining elements is in one example designed as adaptive mounts 58, which is denoted as an option in FIG. 1A with reference number 58. The adaptive mounts 58 are used to vary the location of the hold points in relation to the support structure. In an example, the adaptive mounts 58 are adjustable-length hold members, with which the distance between the hold points and surface support structure can be adjusted.

In another example, the adaptive mounts 58 are alternatively or additionally designed as pivoting arms (not shown in any greater detail), whose pivoting degree relative to the surface support structure can be adjusted.

In an example, the outer skin is designed as a single piece.

FIG. 1B shows the aerodynamic structure 10 with a deviating outer contour 50, which is achieved when the already mentioned actuators in the form of adjustable-length connecting segments result in the surface support structure 16 exhibiting a different shape. As an option, it is also provided that the adjustable-length adaptive mounts 58 can also permit an additional profiling or adjustment of the outer contour.

FIG. 1C presents another variant of the outer contour 50. Proceeding from the outer contour 50 shown in FIG. 1A, which exemplarily depicts a nearly symmetrical profile, FIG. 1B shows how the rear end 60 is downwardly pivoted, and FIG. 1C how it is upwardly pivoted.

In FIG. 1A-1C and FIG. 2, it is shown as an option that the spar is integrated into the surface support structure. For example, the surface support structure is connected to the spar in a central area of the surface support structure in such a way that adaptive areas of the surface support structure transverse to the longitudinal direction of the spar are formed on both sides of the spar, e.g., that a front and rear adaptive area are formed. The spar here forms a fixed structural component, for example.

Figure 3:
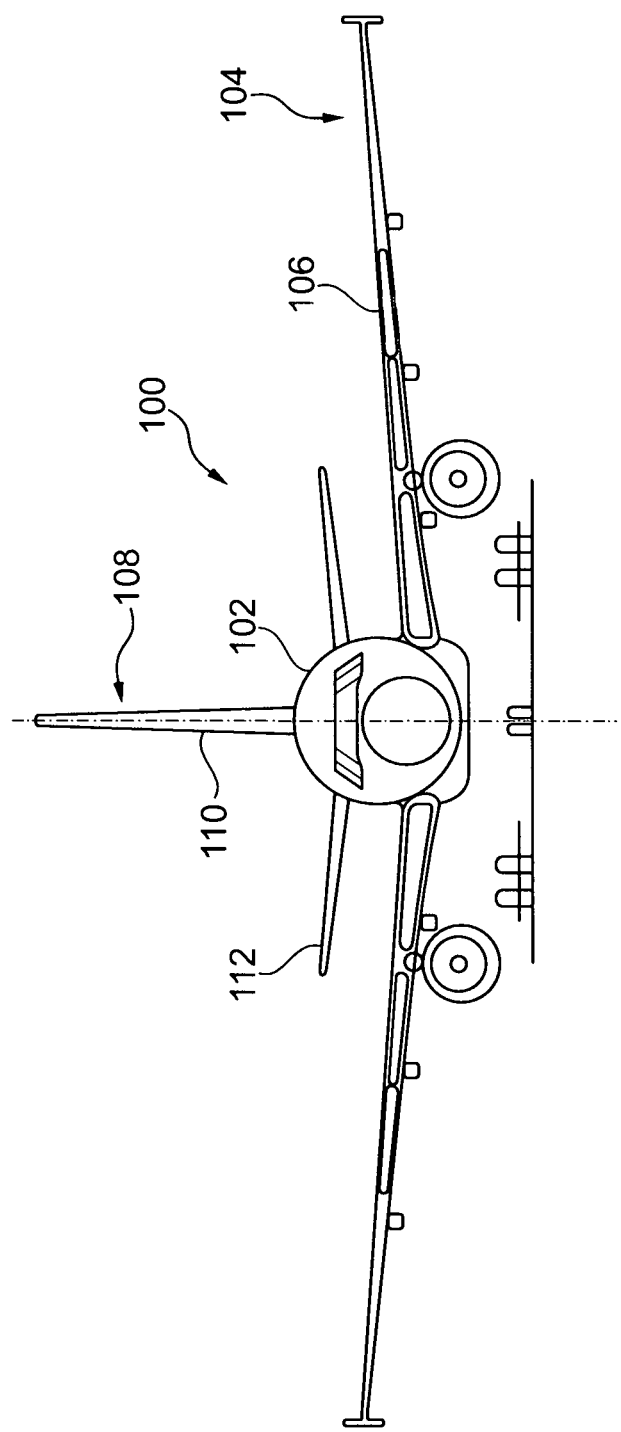
FIG. 3 is a front view of an aircraft.

FIG. 3 shows a front view of an aircraft 100, which comprises a fuselage structure 102, as well as a wing assembly 104 with at least one wing surface 106 and a tail unit 108 with at least one control surface 110. The wing assembly 104 and tail unit 108 are held on the fuselage structure 102. At least one wing surface and/or control surface is designed with an aerodynamic structure 10 according to one of the preceding examples. For example, it is provided that the wing surface 106 be a wing designed with an aerodynamic structure 10 according to one of the preceding examples.

Another example provides that an elevator 112 be designed with an aerodynamic structure 10 according to one of the preceding examples, or additionally/alternatively that a fin 114 be designed with the aerodynamic structure 10.

For example, the aircraft 100 shown in FIG. 3 is an airplane. Apart from the depicted embodiment of a conventional airliner for the commercial aviation sector, for example for the transport of passengers or goods, an aircraft (not shown in any greater detail) is also provided that originates from the area of military airplanes. Another example provides that cargo planes or fighters be designed with the aerodynamic structure 10 at least on a portion of the wing or rudder arrangement area.

Figure 4:
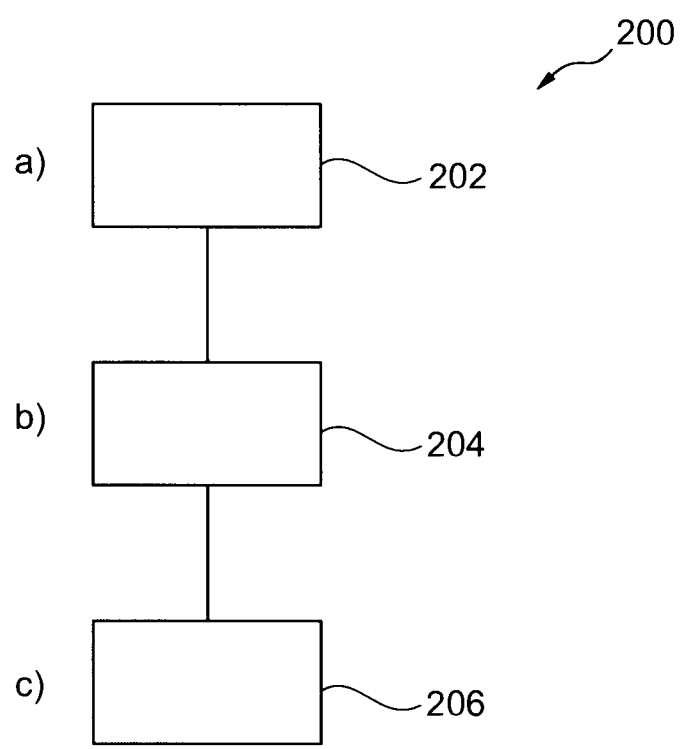
FIG. 4 is an example of a method for adjusting the outer contour of an aerodynamic contour.

FIG. 4 shows a method 200 for adjusting an outer contour of an aerodynamic structure for a wing or rudder arrangement. The method 200 comprises the following steps:

A first step 202 involves a preparation of an aerodynamic structure for a wing or rudder arrangement of an aircraft. The aerodynamic structure exhibits a support structure and an outer skin, wherein the support structure exhibits an adaptive surface support structure in the longitudinal direction, which extends in the longitudinal direction from a root area to an outer end area, and is formed by a support surface, which exhibits an adjustable periodic profiling that runs in a transverse direction, in which first and second flange areas are alternatingly formed, and joined together by web areas running in the direction of a profile height. Alternatingly aligned open profile segments running in the longitudinal direction are here formed. In the area of the open profile segments, the support structure exhibits several connecting segments running in the transverse direction, which join together two adjacent first or second flange areas. At least a portion of the connecting segments are designed as adjustable-length connecting segments. The outer skin is attached to the support surface.

A second step 204 involves adjusting the adjustable-length guide elements.

A third step 206 involves changing the outer contour of the aerodynamic structure.

The first step 202 is also referred to as step a), the second step 204 as step b), and the third step 206 as step c).

The exemplary embodiments described above can be combined in different ways. In particular, aspects of the method can be used for embodiments of the devices and the use of the devices and vice versa.

In addition, it is noted that "comprising" does not preclude any other elements or steps, and that "a" or "an" do not rule out a plurality. It is further be noted that features or steps described with reference to one of the above exemplary embodiments and aspects can also be used in combination with other features or steps of other exemplary embodiments and aspects described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. An aerodynamic structure for a wing or rudder arrangement of an aircraft, comprising:
    a support structure; and
    an outer skin;
    wherein the support structure comprises an adaptive surface support structure in the longitudinal direction, which extends in the longitudinal direction from a root area to an outer end area, and is formed by a support surface, which exhibits an adjustable periodic profiling that runs in a transverse direction, in which first and second flange areas are alternatingly formed, and joined together by web areas running in the direction of a profile height, wherein alternatingly aligned open profile segments running in the longitudinal direction are formed;
    wherein, in the area of the open profile segments, the support structure comprises several connecting segments running in the transverse direction, which join together two adjacent first or second flange areas;
    wherein at least a portion of the connecting segments are designed as adjustable-length connecting segments, so that the distance between the adjacent first or second flange areas can be adjusted;
    wherein the width of the open profile segments can be varied by the adjustable connecting segments;
    wherein the outer skin is attached to the support surface;

wherein an outer contour of the aerodynamic structure can be changed at least in the transverse direction by adjusting the distance between the adjacent first or second flange areas;

wherein the periodic profiling comprises a repeating sequence of flanges and webs and the alternatingly aligned opened profile segments; and wherein the flange areas run on the two opposing outer sides of the profiling, with the first flange areas on one side and the second flange areas on the other side.

2. The aerodynamic structure of claim 1, wherein the adjustable length connecting elements comprise actuating drives, actuating elements, guide elements or actuators.

3. The aerodynamic structure of claim 2, wherein the periodic profiling comprises:
   i) a trapezoidal profiling; and/or
   ii) a wavelike profiling.

4. The aerodynamic structure of claim 3, wherein the web areas and flange areas are interconnected in a longitudinal direction; and
   wherein the profiling can be adjusted in the transverse direction in such a way that a width of the open profile segments can be varied by means of the adjustable connecting segments.

5. The aerodynamic structure of claim 4, wherein at least one open profile segment comprises a spar, which extends in the longitudinal direction from a root area to an outer end area.

6. The aerodynamic structure of claim 5, wherein the spar is integrated into the surface support structure.

7. The aerodynamic structure of claim 6, wherein the surface support structure is connected to the spar in a central area of the surface support structure in such a way that adaptive areas of the surface support structure transverse to the longitudinal direction of the spar are formed on both sides of the spar.

8. The aerodynamic structure of claim 1, wherein the outer skin can be shaped, and is attached to the surface support structure at least partially via hold points by means of retaining elements; and
   wherein at least a portion of the retaining elements is designed as adaptive mounts, with which the location of the hold points in relation to the surface support structure can be varied.

9. The aerodynamic structure of claim 8, wherein the adaptive mounts are adjustable-length hold members, with which the distance between the hold points and surface support structure can be adjusted.

10. The aerodynamic structure of claim 9, wherein the outer skin is a single piece.

11. An aircraft, comprising:
   a fuselage structure,
   a wing assembly with at least one wing surface; and
   a tail unit with at least one control surface;
   wherein the wing assembly and tail unit are held on the fuselage structure; and
   wherein at least one wing surface and/or one control surface is designed with an aerodynamic structure for a wing or rudder arrangement of an aircraft, comprising:
   a support structure; and
   an outer skin;
   wherein the support structure comprises an adaptive surface support structure in the longitudinal direction, which extends in the longitudinal direction from a root area to an outer end area, and is formed by a support surface, which exhibits an adjustable periodic profiling that runs in a transverse direction, in which first and second flange areas are alternatingly formed, and joined together by web areas running in the direction of a profile height, wherein alternatingly aligned open profile segments running in the longitudinal direction are formed;
   wherein, in the area of the open profile segments, the support structure comprises several connecting segments running in the transverse direction, which join together two adjacent first or second flange areas;
   wherein at least a portion of the connecting segments are designed as adjustable-length connecting segments, so that the distance between the adjacent first or second flange areas can be adjusted;
   wherein the width of the open profile segments can be varied by the adjustable connecting segments;
   wherein the outer skin is attached to the support surface;
   wherein an outer contour of the aerodynamic structure can be changed at least in the transverse direction by adjusting the distance between the adjacent first or second flange areas;
   wherein the periodic profiling comprises a repeating sequence of flanges and webs and the alternatingly aligned opened profile segments; and
   wherein the flange areas run on the two opposing outer sides of the profiling, with the first flange areas on one side and the second flange areas on the other side.

12. A method for adjusting an outer contour of an aerodynamic structure for a wing or rudder arrangement, comprising:
   a) providing an aerodynamic structure for a wing or rudder arrangement of an aircraft; wherein the aerodynamic structure exhibits a support structure and an outer skin; and
   wherein the support structure exhibits an adaptive surface support structure in the longitudinal direction, which extends in a longitudinal direction from a root area to an outer end area, and is formed by a supporting surface, which exhibits an adjustable periodic profiling that runs in a transverse direction, in which first and second flange areas are alternatingly formed, and joined together by web areas running in the direction of a profile height, wherein alternatingly aligned open profile segments running in the longitudinal direction are here formed; wherein, in the area of the open profile segments, the support structure exhibits several connecting segments running in the transverse direction, which join together two adjacent first or second flange areas; and wherein at least a portion of the connecting segments are designed as adjustable-length connecting segments; and wherein the outer skin is attached to the supporting surface;
   wherein the periodic profiling comprises a repeating sequence of flanges and webs and the alternatingly aligned opened profile segments; and
   wherein the flange areas run on the two opposing outer sides of the profiling, with the first flange areas on one side and the second flange areas on the other side;
   b) adjusting the adjustable-length connecting segments, wherein a width of the open profile segments in varied by the adjustable connecting segments; and
   c) changing the outer contour of the aerodynamic structure at least in the transverse direction.

* * * * *